United States Patent [19]

Wirkala

[11] Patent Number: 5,346,705
[45] Date of Patent: Sep. 13, 1994

[54] BAIT FOR LOBSTERS AND CRABS AND METHOD OF MAKING THE SAME

[76] Inventor: David S. Wirkala, 13 South St., Yarmouth, Me. 04096

[21] Appl. No.: 45,667

[22] Filed: Apr. 9, 1993

Related U.S. Application Data

[63] Continuation-in-part of Ser. No. 856,502, Mar. 25, 1992, abandoned.

[51] Int. Cl.⁵ .................. A23K 1/10; A23L 1/325
[52] U.S. Cl. ................................ 426/1; 426/129; 426/135; 426/332; 426/442; 426/518; 426/643
[58] Field of Search .............. 426/1, 442, 129, 135, 426/332, 643, 518

[56] References Cited

U.S. PATENT DOCUMENTS

| | | | |
|---|---|---|---|
| 2,452,553 | 11/1948 | Curtis, Jr. et al. | 99/3 |
| 3,730,728 | 5/1973 | Patashnik et al. | 99/3 |
| 5,216,829 | 6/1993 | Morton | 426/1 |

FOREIGN PATENT DOCUMENTS 0114150  6/1985  Japan ........................ 426/1

*Primary Examiner*—Helen Pratt

[57] ABSTRACT

Bait for use in trapping lobsters and crabs and method of making the same require that fish wastes, including meat, skin and bones be ground to produce particles in the one half inch size range. While the ground particles are predominantly in that size range, a minor percentage of oversized and undersized particles are also produced. The undersized particles are in the approximate range of three eighths inches while the approximate size of the oversized particles is three fourths inches. The ground particles are thoroughly mixed with rock salt in amounts sufficient for their preservation for a suitable shelf life and to expose the particles to the air. The coagulating mixture is then packaged in containers which are porous at least when wet and the packaged baits are ready to use when the mixture has solidified.

3 Claims, No Drawings

BAIT FOR LOBSTERS AND CRABS AND METHOD OF MAKING THE SAME

A continuation in part of application Ser. No. 07/856,502 filed Mar. 25, 1992, abandoned.

BACKGROUND OF THE INVENTION

While baits in accordance with the invention are effective in trapping crabs as well as lobsters, the baits are discussed herein with particular reference to the lobster fishery.

Lobster fishing is a substantial industry as in 1991, in the State of Maine, the catch was about 30 million pounds with some 3,000 licensed fishermen about half of whom held commercial licenses.

Traps for both lobsters and crabs are baited with trash fish adequate supplies of which are usually freely available to the fishermen but, if not, then bait supplies must be bought from dealers. In practice, each trap is baited with such fish by placing them in coarse nets attached to the traps. At regular intervals, three days or less, weather permitting, the traps are hauled, the catch removed, rebaited and returned to the ocean bottom. It is, of course, necessary that the bait remains effective during such intervals and ideally for as long as a week.

Trap bait also consists of wastes from fish processing plants with the wastes free to the fisherman as, if not thus disposed of, they must, at a cost, be shipped offshore and dumped.

There is, accordingly, a need for a product which will avoid the expense to the fish processor of such shipments and at the same time provide the fishermen with an effective, inexpensive bait which has a useful underwater life longer than raw fish or raw fish wastes, is easier and more convenient to use and has a shelf life such that a supply can be kept on hand for reasonable storage intervals.

That fish wastes make good bait has long been recognized as has been the fact that for its use, the rate of dissemination had to be controlled. At one time, fish wastes were packaged in tins which were to be punctured before being placed in the traps while several proposals have been made to use such wastes in several different ways.

One such proposal required the preparation from such wastes to be in self-opening packages while others were designed to be caught on hooks then to release the essences of the bait with one limiting the maximum fish waste particle size to one eighth inch. Other proposals required that fish wastes be comminuted before being incorporated with other materials in the product. Another proposal required that fish wastes be ground and dried to provide particles similar in size to coarse corn meal and with most of their moisture content removed, the particles were then compacted by means of a hydraulic ram to provide a product which could be cut into wafers for use.

THE PRESENT INVENTION

The general objective of the present invention is to provide a bait for lobsters and crabs formed of coarse ground fish waste mixed with rock salt and packaged in cloth or paper with the bait having an underwater life of about a week, a substantially longer shelf life, as effective in use as raw fish or fish wastes in attracting lobsters and crabs and easy to use by the fisherman.

In accordance with the invention, such objectives are attained with ground fish wastes in the approximate one half inch size range, thoroughly mixing therewith salt in the approximate range of ten to twenty five per cent of the volume of the ground fish and then usually packing the resulting mass with the product soon ready for distribution and use. A feature of the thus packaged products is that they may be handled as a somewhat salt encrusted solid product which has but little odor.

THE PRESENTLY PREFERRED EMBODIMENT

In the practice of the invention to achieve its objectives, a supply of fish waste is secured from a processor. While such a supply depends on the volume obtainable, it is of a much greater volume that one fisherman could use before most of it would spoil. Such fish wastes comprise meat, skin and bones and sometimes whole fish.

That supply is then ground with the grinder set to produce particles of one half inch size. As a result of the grinding, the particles are predominantly of the wanted one half inch size but there will be a minor amount of smaller particles approximately in the three eighth inch size range and a minor amount of larger particles approximately five eighths of an inch in size.

It has been found that it is critical that the particles be so ground that the ground mass is predominantly approximately one half inches in size. While particles of the three eighths inch size are acceptable, were an attempt made to grind the fish wastes to produce bait particles of that size, there would be the likelihood that clogging of the grinder would result for the most part increasing the time required for grinding. The larger particles would, however, be of a satisfactory size. If a grinder were set to produce particles of a five eighths inch size, the smaller particles would be acceptable but the larger particles would be objectionable for the reason presently explained.

It is important to the invention that the ground mass be prepared for packaging as soon as its preservation can be assured. Accordingly a ground mass is immediately so thoroughly mixed with rock salt in the approximate volume range of 10% to 25% of the ground mass that the ground particles are all well exposed to the air. Some of the rock salt may be added to the fish waste during the grinding step.

Coagulation starts during the mixing step and while there usually is little, if any, blood in any volume of fish waste procured at a processing plant, lipids are present in the ground waste. The larger the particle size the longer the interval required for coagulation to occur. This is a consequence of the oversized particles not having released the same proportional amount of lipids that the other particles have exposed. For that reason, particles larger than five eighths of an inch are not satisfactory for use in converting fish wastes into a stable product on an economical basis.

After the ground mass and rock salt are thoroughly mixed and while the mixture is in a semi-fluid state, it is packaged in porous paper or paper that will become porous or disintegrate in the traps or cloth sleeves. While in experimental work and in preference to spooning the mixture into the packages, the grinder was used as a packaging aid, for commercial use equipment such as a sausage stuffer enable packaging to be effected quicker and easier. It should be noted that in passing the mixture again through the grinder without changing its setting, has little if any effect on particle sizes as there is no appreciable resistance offered by the mixture. It will be appreciated that the initial grinding of the wastes represent the greatest labor charge on production.

No attempt is made to reduce the moisture content of the fish wastes. For example, a five gallon pail of so-called racks may contain a small amount of free liquid, say five ounces and a five gallon pail of the fish wastes and salt mixture may contain a smaller volume of liquids. Fish wastes in some cases, may include whole or substantially whole fish.

The packaging is preferably effected by packing a predetermined volume in a porous sleeve or one which will become porous when wet, with the sleeve then severed to provide lengths each having the sleeve ends closed and containing a predetermined weight of processed bait. It has not been necessary to compact the material beyond the degree normally attendant the machine loading of the sleeves. Within a few hours, the bait is solidified and ready for use. In practice, a day's production is ready for distribution and use the following morning. In practice the sleeves are fabric and have a mesh, the stretched interstices of which are desirably not more than one fourth inch.

At that time, even though the sleeve is porous and stretched, none of the coagulated product escapes and although usually encrusted, the packaged bait is dry to the touch and has but a slight fish odor.

It is theorized that grinding the fish wastes exposes the lipids in the fish wastes and tissues to oxygen during the mixing step which causes oxidation resulting in coagulation and the solidifying of the ground product. The product is not noticeably affected by ocean water temperatures and does not readily disintegrate in warm waters.

As coagulation starts as soon as the salt and ground fish wastes are thoroughly mixed, it is preferred that the product be packaged while in a semi-fluid condition. The product, once it has solidified, may, however, be pulled apart in chunks or cut into sections. It is preferred that even such formed chunks or sections be packaged even when the baits are to be held within the coarse mesh bags attached to the traps. It is also preferred that the packages containing the products be biodegradable although packages may be used which may be easily opened and properly disposed of once the solidified baits are removed therefrom by the lobsters or crabs.

The salt supply added to the ground fish wastes must be adequate to function as a preservative therefor. Too much salt for preservation purposes leaves some salt free while too little salt affects the life of the bait adversely. It is necessary to use rock salt in order to minimize costs. In practice, excellent results are obtained in Maine with the rock salt about 15% of the volume of ground particles. In areas where ambient temperatures are high, the percentage of the rock salt for a given volume of the ground particles should be increased to prevent spoilage.

From the foregoing, it will be appreciated that the invention enables fish wastes to be recycled as low cost bait for use in traps employed in catching lobsters and crabs.

I claim:

1. The method of converting fish wastes containing meat, skin and bones into a shaped bait for use in trapping lobsters and crabs, said method consisting of the steps of grinding such wastes in a manner such as to produce a supply of coarse ground particles predominately in the one-half inch size with minor amounts of over-sized particles which require a longer interval to coagulate than the one-half inch particles and minor amounts of under-sized particles which clog the grinder, the under-sized particles being in the three-eighths inch size range and the over-sized particles being in the five-eighths inch size; mixing the coarse ground particles with a volume of rock salt, said rock salt being approximately in the range of 10% to 25% of the volume of coarse ground particles to thereby treat all the particles with rock salt and to expose all particles to the air, whereby a semi-fluid mixture is formed; packaging the semi-fluid mixture in containers which are porous at least when wet and which also shape the mixture until coagulated to form a salt encrusted solid product having little odor.

2. The method of claim 1 in which the volume of the rock salt is approximately 15% of the volume of the ground waste.

3. A product made by the process of claim 1.

* * * * *